United States Defensive Publication [19] (H) [11] T962,004
Dostes et al. [43] Sept. 6, 1977

[54] METHOD OF PREPARING SILVER HALIDE GRAINS OF IMPROVED PHOTOGRAPHIC AND HANDLING CHARACTERISTICS

[76] Inventors: Claude G. Dostes; Dany C. Dubromel; Jean-François Le Guen, all c/o Kodak Pathe, Vincennes, France

[21] Appl. No.: 782,572

[22] Filed: Mar. 29, 1977

Related U.S. Application Data

[63] Continuation of Ser. No. 637,491, Dec. 3, 1975, abandoned.

[51] Int. Cl.[2] ..... G03C 1/28; G03C 1/30

[52] U.S. Cl. ..... 96/110; 96/109; 96/108

[57] ABSTRACT

A method is disclosed of forming silver halide grains capable of forming a surface latent image upon exposure to visible light. The grains are formed by incorporating from $10^{-6}$ to $10^{-10}$ mole of iridium per mole of silver before first ripening. The iridium is incorporated in the presence of a water soluble purine base or a water soluble salt thereof.

15 Claims, No Sheets Drawing,

17 Pages Specification

The file of this unexamined application may be inspected and copies thereof may be purchased (849 O.G. 1221, Apr. 9, 1968).